(12) United States Patent
Stuckey (10) Patent No.: US 10,583,695 B2
(45) Date of Patent: Mar. 10, 2020

(54) METHOD AND APPARATUS FOR UTILIZING PREPRINTED LABELS AND APPLIQUES ON A TIRE

(71) Applicant: Bridgestone Americas Tire Operations, LLC, Nashville, TN (US)

(72) Inventor: Jon I. Stuckey, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/541,049

(22) PCT Filed: Dec. 2, 2015

(86) PCT No.: PCT/US2015/063405
§ 371 (c)(1),
(2) Date: Jun. 30, 2017

(87) PCT Pub. No.: WO2016/109088
PCT Pub. Date: Jul. 7, 2016

(65) Prior Publication Data
US 2017/0361663 A1    Dec. 21, 2017

Related U.S. Application Data

(60) Provisional application No. 62/097,777, filed on Dec. 30, 2014.

(51) Int. Cl.
*B29D 30/72* (2006.01)
*B60C 13/02* (2006.01)
*B60C 13/00* (2006.01)

(52) U.S. Cl.
CPC ............ *B60C 13/001* (2013.01); *B29D 30/72* (2013.01); *B29D 2030/728* (2013.01); *B60C 13/02* (2013.01)

(58) Field of Classification Search
CPC .................... B29D 2030/726; B29D 2030/728
See application file for complete search history.

(56) References Cited

U.S. PATENT DOCUMENTS

| 3,449,201 A | 6/1969 | Palmquist et al. |
| 4,224,268 A | 9/1980 | Merli et al. |
| (Continued) | | |

FOREIGN PATENT DOCUMENTS

| EP | 1073031 A1 * | 1/2001 | ........... B60C 13/001 |
| EP | 2548722 | 1/2013 | |
| (Continued) | | | |

OTHER PUBLICATIONS

Machine Translation: EP-2548722-A1; Gerhardt Joachim; (Year: 2019).*

(Continued)

*Primary Examiner* — Kendra Ly (57) ABSTRACT

A tire for displaying at least one indicium includes a label affixed to the tire at a mounting location. The label has a first side facing away from the tire and a second side connected to the tire. The label's first side is configured to receive at least one adhesive appliqué having at least one indicium. The mounting location is a location on a sidewall of the tire where the label undergoes a strain equal to or less than a threshold strain under pre-defined conditions.

17 Claims, 6 Drawing Sheets

(56) References Cited

U.S. PATENT DOCUMENTS

| | | | |
|---|---|---|---|
| 4,684,431 A * | 8/1987 | Shurman | B29C 33/14 156/116 |
| 4,767,481 A * | 8/1988 | Bryant | B60C 13/04 156/116 |
| 5,300,164 A | 4/1994 | Detrano et al. | |
| 5,904,794 A | 5/1999 | Boissonnet et al. | |
| 6,235,376 B1 * | 5/2001 | Miyazaki | G09F 3/02 428/195.1 |
| 6,391,134 B1 | 5/2002 | Lipovac | |
| 7,153,381 B2 | 12/2006 | Majumdar et al. | |
| 7,387,144 B2 | 6/2008 | Byrne | |
| 7,398,810 B2 | 7/2008 | Peyron et al. | |
| 2005/0059308 A1 * | 3/2005 | Parsons | B60C 13/001 442/149 |
| 2006/0032569 A1 | 2/2006 | Zimmer et al. | |
| 2007/0158436 A1 * | 7/2007 | Ichikawa | B60C 13/001 235/492 |
| 2007/0209743 A1 | 9/2007 | Mellet | |
| 2008/0257471 A1 | 10/2008 | Collin et al. | |
| 2010/0092716 A1 * | 4/2010 | Spychalsky | B32B 25/08 428/41.8 |
| 2013/0126063 A1 | 5/2013 | Landers et al. | |
| 2013/0133800 A1 | 5/2013 | Griffoin et al. | |
| 2013/0133801 A1 | 5/2013 | Hodges et al. | |
| 2013/0160913 A1 | 6/2013 | Lonkar et al. | |

FOREIGN PATENT DOCUMENTS

| | | | | |
|---|---|---|---|---|
| EP | 2548722 A1 * | 1/2013 | | B29D 30/72 |
| EP | 2548722 B1 * | 3/2016 | | B29D 30/72 |
| JP | 0640219 | 2/1994 | | |
| JP | H0640219 | 2/1994 | | |
| JP | 2006082572 | 3/2006 | | |
| JP | 2009280690 | 12/2009 | | |
| JP | 2011170105 A * | 9/2011 | | |
| WO | WO-2006121439 A1 * | 11/2006 | | B29C 33/306 |
| WO | 2013006562 | 1/2013 | | |

OTHER PUBLICATIONS

Machine Translation: JP-2011170105-A; Kijima, Masaru; (Year: 2019).*
International Search Report and Written Opinion; Corresponding PCT Application No. PCT/US2015/063405; Commissioner; Korean Intellectual Property Office, Seo-gu, Daejeon, Republic of Korea; dated Feb. 19, 2016.
Yokohama Rubber Co Ltd, English Abstract of JP2006082572A, dated Mar. 30, 2006.
Sumitomo Rubber Ind, English Abstract of JPH0640219A, dated Feb. 15, 1994.
Yokohama Rubber Co Ltd, English Abstract of JP2009280690, dated Dec. 3, 2009.

* cited by examiner

METHOD AND APPARATUS FOR UTILIZING PREPRINTED LABELS AND APPLIQUES ON A TIRE

FIELD OF INVENTION

The present disclosure is directed to a method and apparatus for utilizing preprinted labels and adhesive appliqués that may be affixed to labels. More particularly the present disclosure is directed to a method for manufacturing a tire with affixed preprinted labels and optional adhesive appliqué, the tire itself, and a method for affixing an adhesive appliqué to a tire.

BACKGROUND

Adhesive appliqués known in the art suffer from degradation when affixed to a sidewall of a tire at a non-ideal location. When an adhesive appliqué is applied to a location on a sidewall of a tire that undergoes a high strain, the cyclical loading and unloading of the sidewall may cause the adhesive appliqué to fail and fall off of the sidewall. Other fixed sidewall tire labels known in the art are incapable of customization after the manufacturing process, and are not designed to receive an adhesive appliqué to allow customization by an end-user.

SUMMARY

In one embodiment, a method for providing a tire configured to receive a pre-printed adhesive appliqué includes identifying a threshold strain of an adhesive appliqué and identifying a mounting location on a tire sidewall that undergoes a strain less than or equal to the threshold strain under pre-defined conditions. The method also includes providing a label configured to be mounted on a sidewall of the tire at the mounting location. The method further includes curing the tire while the label is adjacent to the mounting location on the sidewall of the tire.

In another embodiment, a method for affixing an adhesive label to a tire includes obtaining a tire that has a label located at a mounting location of the tire. The mounting location of the tire is on a sidewall of the tire, where the label undergoes a strain less than or equal to a threshold strain under pre-defined conditions. The method further includes obtaining an adhesive appliqué and affixing the adhesive appliqué to the label.

In yet another embodiment, a tire for displaying at least one indicium includes a label affixed to the tire at a mounting location. The label has a first side facing away from the tire and a second side connected to the tire. The label's first side is configured to receive at least one adhesive appliqué having at least one indicium. The mounting location is a location on a sidewall of the tire where the label undergoes a strain equal to or less than a threshold strain under pre-defined conditions.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" as used herein, refers to that portion of the tire between the tread and the bead.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Figure 1:
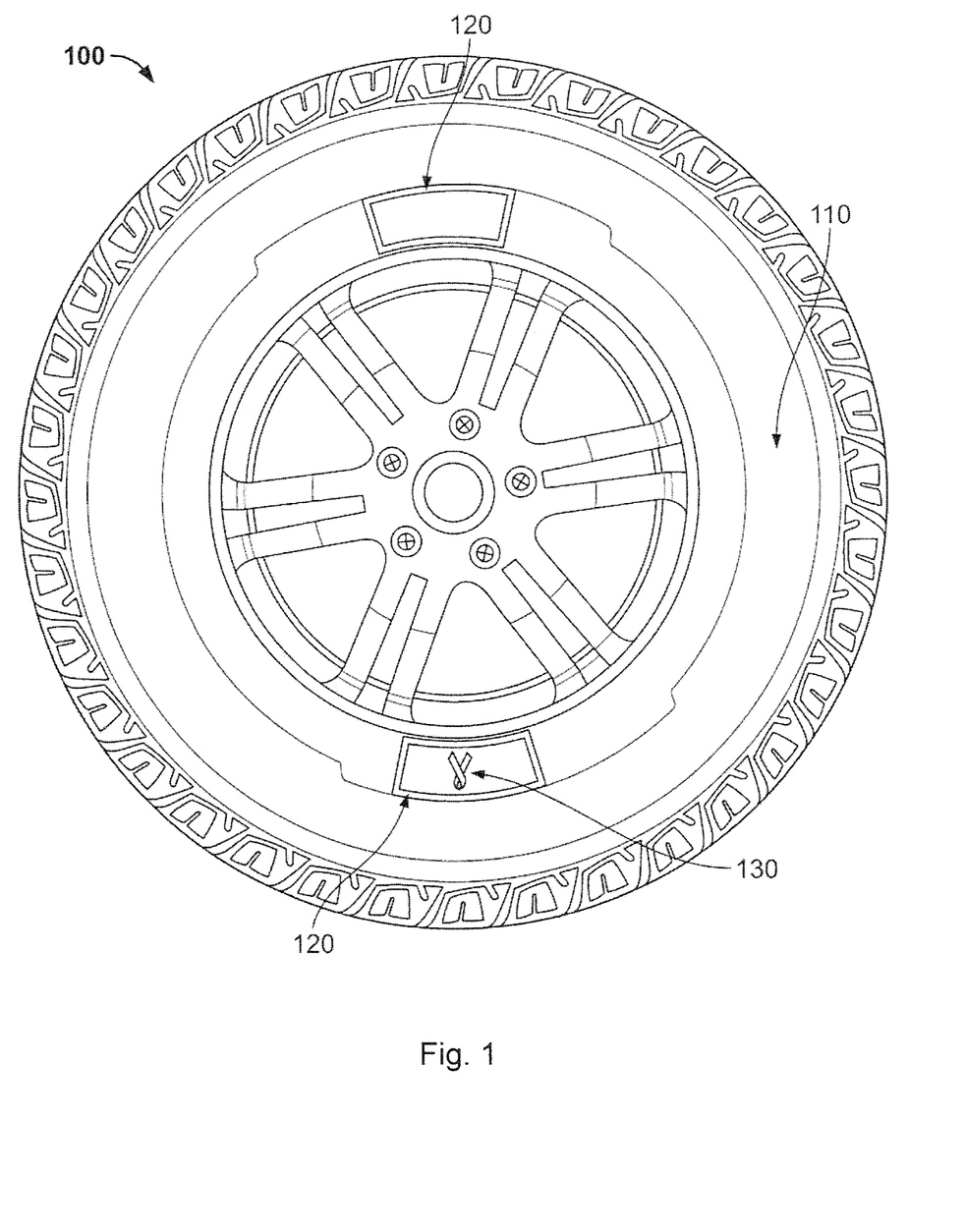
FIG. 1 is a side view of one embodiment of a tire having labels affixed at exemplary mounting locations.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element FIG. 1 illustrates a tire 100 having a sidewall 110. Affixed to sidewall 110 are two labels 120. The top and bottom edges of labels 120 are curved in this embodiment, while the side edges are straight. In alternative embodiments, the top, bottom, and side edges of labels can include any combination of straight and curved edges. For example, the top, bottom, and side edges of labels can all be straight, forming a rectangular shape. In other embodiments, the labels can be formed in any geometric shape, including shapes with more or less than four edges.

One surface of each label 120 can display a logo, graphic, design, or other indicia. The other surface of labels 120 is suited for attaching to a tire 100. In alternative embodiments the labels may include any type of indicia, including text such as slogans, phrases, symbols, etc. In still other embodiments, the labels may be blank and not include any type of indicia.

In one embodiment, the labels may be applied to a green tire in a mold. Labels applied in this manner may be referred to as "in situ labels." In situ labels can be made from ethylene-vinyl acetate copolymer, fluorocarbon rubber, halogenated butyl rubber, melt processible rubber, neoprene rubber, nitrile rubber, silicone-modified ethylene propylene diene monomer ("EPDM") rubber, silicone rubber, rubber-epoxy mixture, cyanoacrylate-rubber mixture, natural rubber, sulfur-cured EPDM rubber, peroxide-cured EPDM rubber, butyl rubber, ethylene acrylic rubber, bisphenol-cured fluorocarbon rubber, styrene-butadiene rubber, castable urethane, millable urethane, thermoplastic urethane, and other polymeric or elastomeric materials.

In another embodiment, labels may be applied to a cured tire. Such labels may be referred to as a "post-manufactured labels." Post-manufactured labels can be made from ethylene acrylic rubber, ethylene-vinyl acetate copolymer, fluorosilicone rubber, halogenated butyl rubber, melt processible rubber, neoprene rubber, nitrile rubber, polyacrylate rubber, rubber-epoxy mixture, urethane resin, cyanoacrylate-rubber mixture, ethylene acrylic rubber, bisphenol-cured fluorocarbon rubber, styrene-butadiene rubber, peroxide-cured silicone, castable urethane, millable urethane, thermoplastic urethane, and other polymeric or elastomeric materials In the illustrated embodiment, two labels 120 are depicted, but those skilled in the art will appreciate that any number of labels 120 may be included without departing from the scope of the present disclosure. In the embodiment shown, one of the labels 120 includes an adhesive appliqué 130 affixed thereto.

The adhesive appliqué 130 may include a logo, slogan, symbol, design, phrase, solid color, or any other indicia. The adhesive appliqué 130 includes an adhesive on one surface, and the displayed indicia on the other surface. For example, one surface of adhesive appliqué may be a gummed adhesive surface, while the other displays a breast cancer ribbon logo. The adhesive is configured to adhere to the material of a label, such as label 120. Additionally, the adhesive is configured to adhere to a display surface of a second adhesive appliqué, so that a given adhesive appliqué may be fastened over another adhesive appliqué 130, if desired. This way, a user may selectively display different indicia based on preference.

In other embodiments (not shown), the adhesive appliqué may be blank or may be the same color as a tire sidewall. This way, a user may selectively cover a label or an adhesive appliqué that the user no longer wishes to display.

Labels 120 are mounted to the sidewall 110 at a mounting location where a strain in the radial direction is equal to or below a threshold value. The mounting location can be unique to every tire, and can be calculated based on the operating conditions of a particular tire (e.g., load, rotation speed, torsion, etc.), and on the mechanical properties of either a label 120 or an adhesive appliqué 130. This threshold value is determined by first defining a level of strain for either a label 120 or an adhesive appliqué 130, based on the ultimate tensile strength, fatigue life, maximum elastic strain, and other material properties for a label 120 or adhesive appliqué 130. Using these properties, a designer may select a threshold value for a given label 120 or an adhesive appliqué 130. For example a threshold value for a typical adhesive appliqué falls within a range of 0 to 10%, but may fall anywhere within a range of 0 to 25%. In this way, a label 120 or an adhesive appliqué 130 attached to the label 120 will undergo strain equal to or less than a threshold value. A higher threshold value tends to result in more rapid degradation of the label or the adhesive appliqué, and a lower threshold value tends to result in less rapid degradation of the label or the adhesive appliqué. Based on the properties of the label 120, adhesive appliqué 130, the tire 100, and the desired life cycle for the label 120 or the adhesive appliqué 130, a person of ordinary skill in the art will be able to determine the threshold value.

To determine the mounting location, a designer can run tests known in the art to determine the strain distribution of a tire's sidewall under specified conditions. For example, a designer may run tests for meeting requirements of the National Highway Traffic Safety Administration, the Department of Transportation, or other regulatory bodies. Endurance testing may be performed under low inflation conditions (e.g., at 14-19 PSI, or other inflation levels below standard operational pressure), high load conditions (such as at 200% of maximum load), high temperature conditions (e.g., above 100° F.), or a combination of such conditions. Once the designer determines the locations on the tire sidewall that will undergo strain that is at or below a selected strain, the designer identifies a mounting location.

In one embodiment, the labels 120 are flush with sidewall 110 of tire 100. In an alternative embodiment, the labels protrude axially outward from the sidewall. In another alternative embodiment, the labels are depressed axially inward from the sidewall.

Figure 2A:
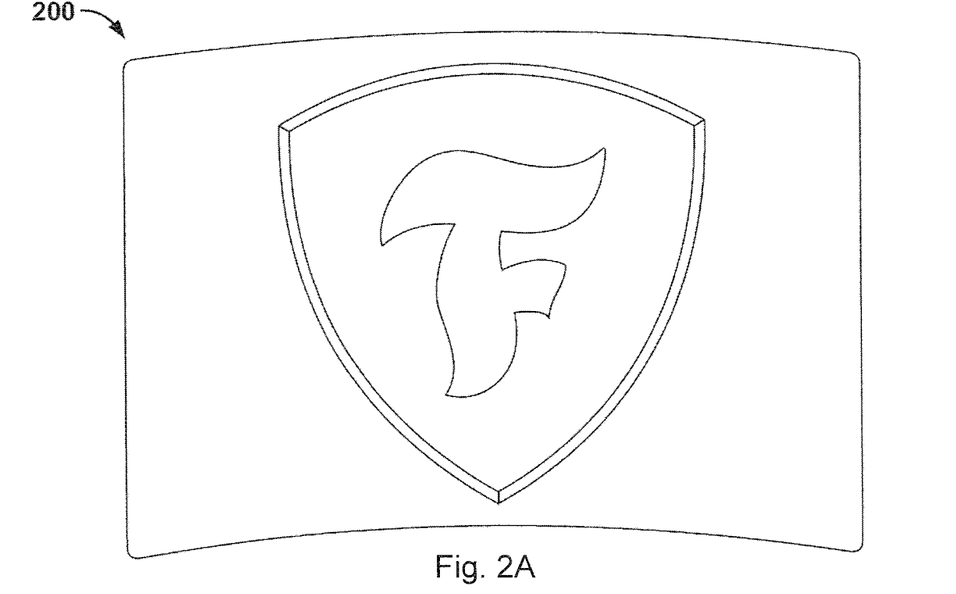
FIG. 2A is a front view of an exemplary label that can be used with the tire of FIG. 1.

FIG. 2A is a close up view of an exemplary label 200. Label 200 includes a logo on one side. In this embodiment, the logo is a corporate logo. Label 200 may be used in conjunction with the tire of FIG. 1. In alternative embodiments, label 200 may also include a radio frequency identification ("RFID") tag or chip, for gathering and providing data according to methods known in the art.

Figure 2B:
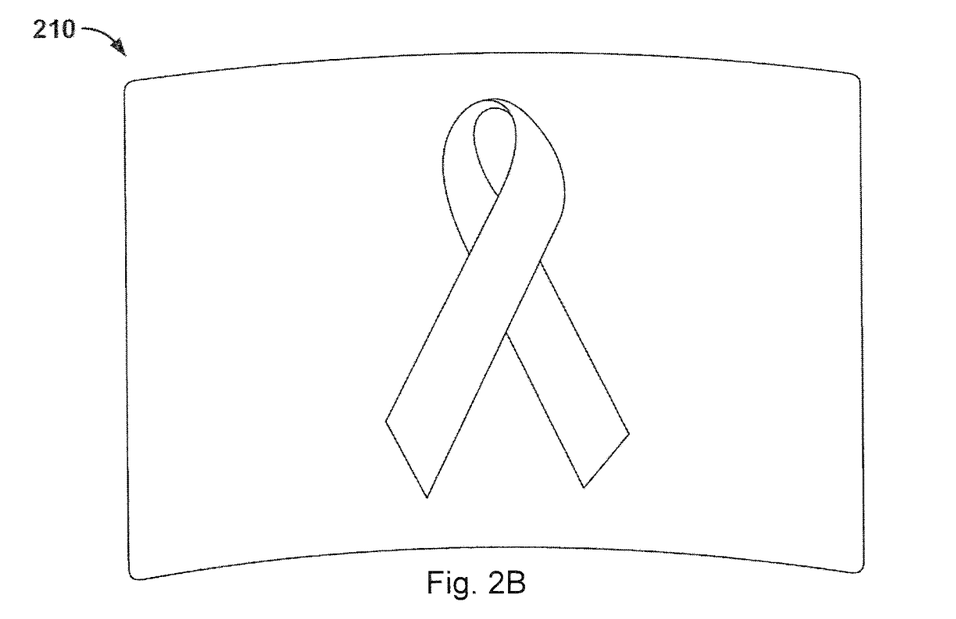
FIG. 2B is a front view of an exemplary adhesive appliqué that can be used with the tire of FIG. 1.

FIG. 2B is a close up view of another exemplary adhesive appliqué 210 displaying a logo. In this example, the logo is a symbol for a cause. In other embodiments, the logo may represent, without limitation, a team, a geographic location, a hobby, a religious organization, other organizations, or a personal message.

Figure 3:
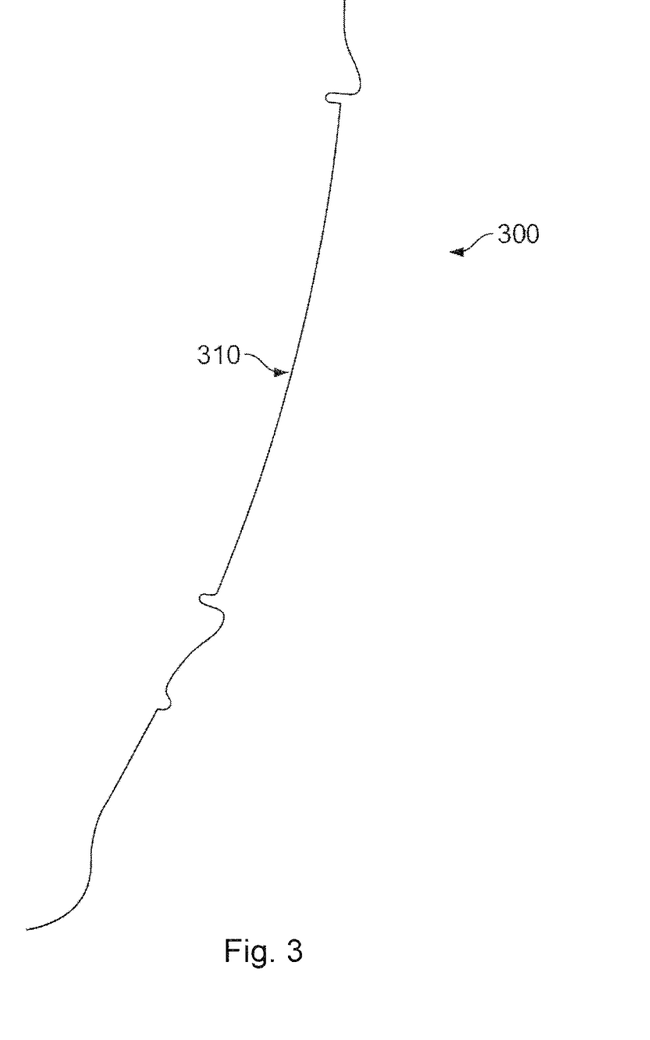
FIG. 3 is a schematic drawing of a portion of a tire mold configured to receive a label.

FIG. 3 is a cross-section of a portion of a tire mold 300 having a securing device used to manufacture a tire having a label. In this embodiment, securing device takes the form of an indentation 310, which is sized to receive a label (such as label 120) and to hold the label in place while a green tire is inserted into mold 300 for curing. In this embodiment, when a label is inserted into indentation 310, the label will have a rubber-backed side facing the interior of the tire mold. During the curing process, the rubber-backed side of the label becomes vulcanized and bonds with the sidewall of the tire, thereby becoming permanently affixed to the tire. As seen in FIG. 3, the indentation 310 can be designed such that the label will be substantially flush with the sidewall of the tire after curing.

The indentation 310 in this embodiment is at a mounting location as discussed with respect to FIG. 1 above. The mounting location may be unique to a specific tire, a specific label, or a specific adhesive appliqué.

Alternatively, the tire mold may include a different securing device. For example, the tire mold may include a vacuum line (not shown) extending through the tire mold, which creates a vacuum at an interior surface of the tire mold. One of ordinary skill will appreciate that such a vacuum line may be inserted at a desired mounting location, to hold a label in place during the curing process. Those of skill in the art will appreciate that any other type of securing device may be practiced with the tire mold of the present embodiment. Any securing device that holds a label in place during a curing process may be employed.

In other alternative embodiments (not shown), the label may be disposed between ribs, between posts, or between retractable grippers of the tire mold prior to curing. In another alternative embodiment, one or more magnets (not shown) retain the label against the tire mold. In yet another alternative embodiment, electrostatics may be employed to retain the label against the tire mold.

In an alternative embodiment (not shown), the label may be placed on the green tire prior to curing, and the green tire is positioned such that the label aligns with appropriate geometry of the mold. In such an embodiment, adhesive may be employed to affix the label to the green tire. Alternatively, the green tire may be sufficiently tacky, such that adhesive is not required.

In an alternative embodiment (not shown), the mold does not include any special geometry or means for retaining the label. Instead, in one embodiment, the mold is oriented substantially horizontally, and the label may simply be positioned at a desired location on the mold. The label will remain in place due to gravity. In an alternative embodiment, the label may be placed on the green tire prior to curing In other embodiments (not shown), the label may be affixed to the tire after the tire has been cured. In one such embodiment, the label will have an adhesive surface on one side, for attachment to the tire. In another such embodiment, adhesive is applied to the sidewall or to the label, and the label is then affixed to the sidewall at the mounting location.

Figure 4:
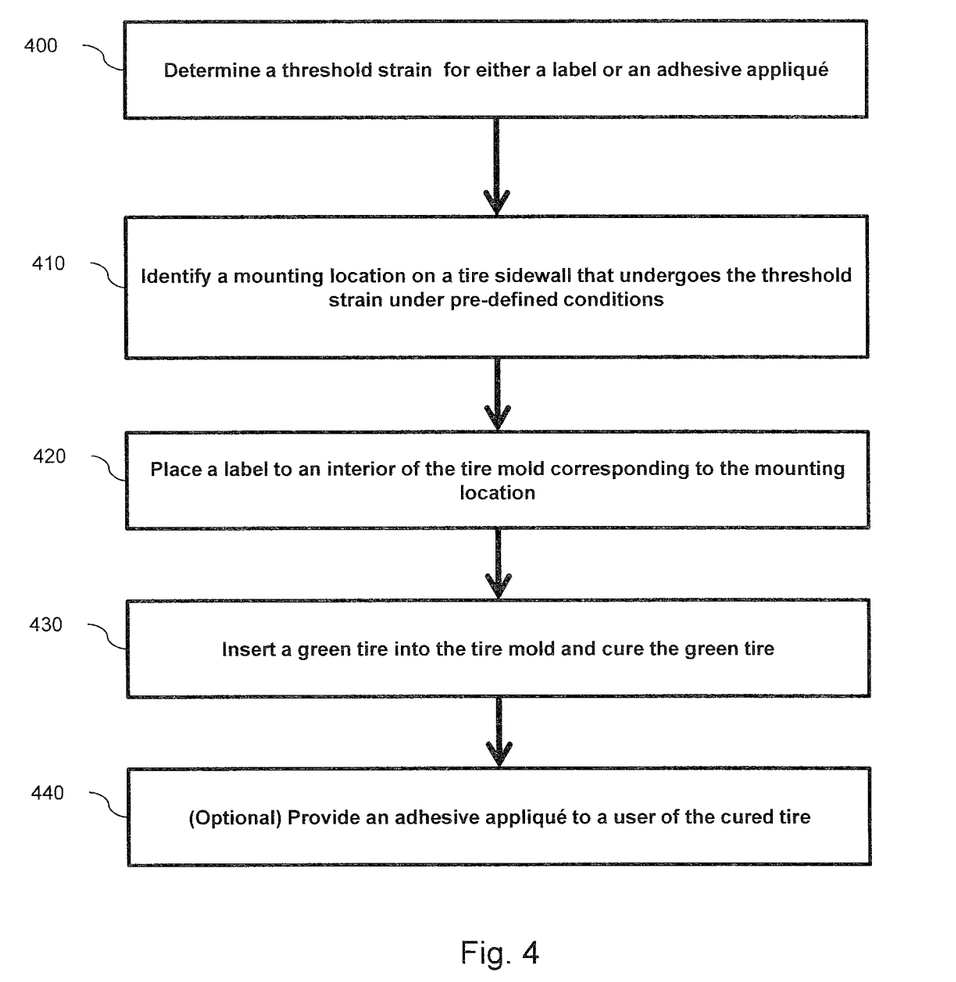
FIG. 4 is a flow chart of an exemplary method of manufacturing a tire and affixing a label at an exemplary mounting location, wherein the label is affixed during the curing process.

FIG. 4 is a flow chart describing manufacturing steps for providing a tire having a label. At step 400, a designer or manufacturer determines, based on the constraints of a particular application, a threshold strain for either a label or an adhesive appliqué for attachment to a label. To perform step 400, the designer or manufacturer will take into account the mechanical properties of the label or the adhesive appliqué and a desired life cycle for the same. At step 410, the designer or manufacturer will then identify a location on a sidewall of a particular tire where the label or adhesive appliqué would undergo strain that is equal to or less than the threshold strain when the tire is loaded and operating under pre-defined conditions. The designer or manufacturer will determine the pre-defined conditions based on the particular constraints of each application. For example, the pre-defined conditions might include a particular tire model's average operating speed, loading conditions, driving conditions, and weather conditions.

At step 420, the designer or manufacturer will place a label into a tire mold corresponding to the mounting location of a tire formed by the mold. At step 430, the designer or manufacture will insert a green tire into the mold and cure the tire, thereby affixing the label to the tire at the mounting location.

Optionally, at step 440 an adhesive appliqué is provided to an end-user of the cured tire, for attachment to the label.

Figure 5:
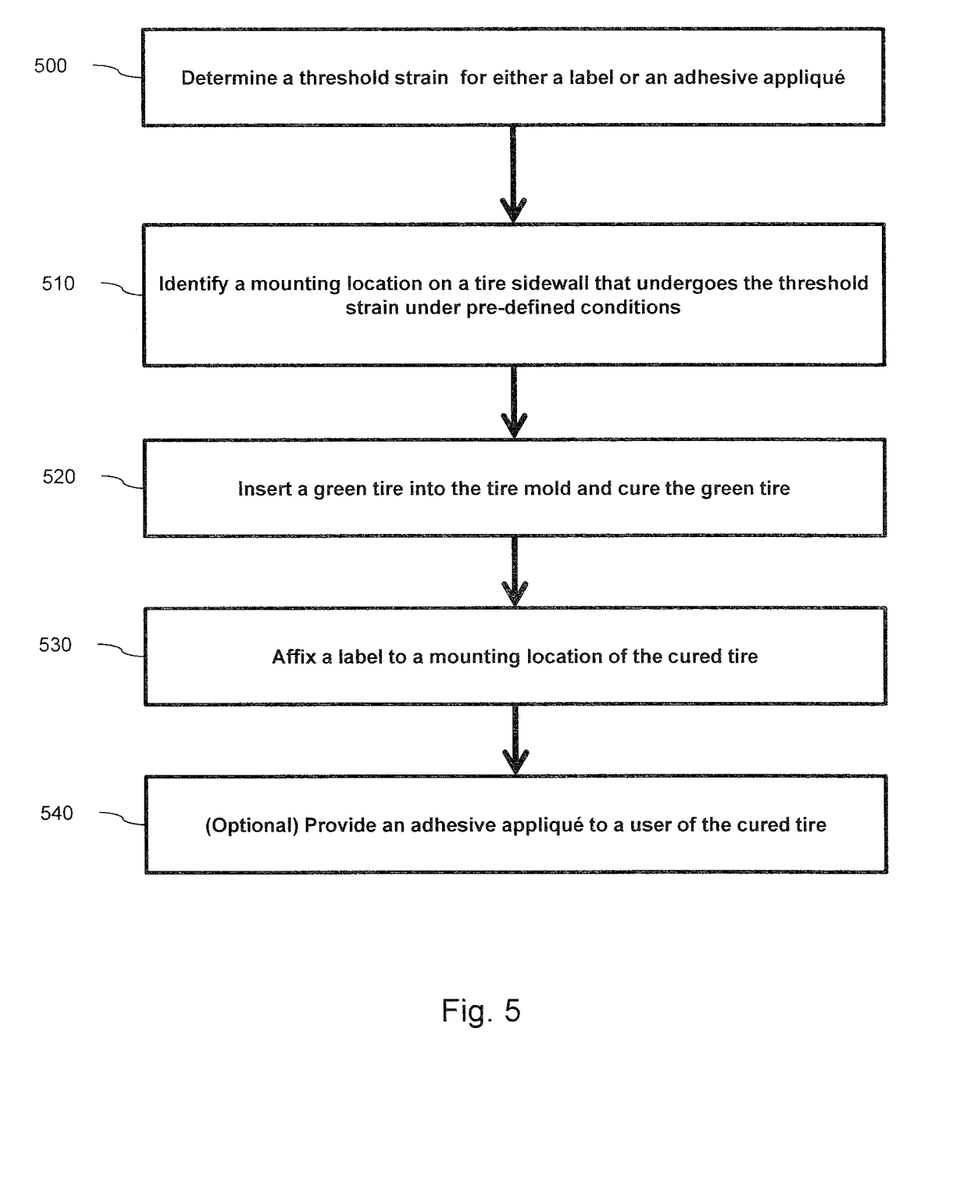
FIG. 5 is a flow chart of an exemplary method of manufacturing a tire and affixing a label at an exemplary mounting location, wherein the label is affixed after the curing process.

FIG. 5 is a manufacturing process similar to that of FIG. 4, only differing in the step for attaching a label to the tire. At step 500, a designer or manufacturer determines, based on the constraints of a particular application, a threshold strain for either a label or an adhesive appliqué for attachment to a label. To perform step 500, the designer or manufacturer will take into account the mechanical properties of the label or the adhesive appliqué and a desired life cycle for the same. At step 510, the designer or manufacturer will then identify a location on a sidewall of a particular tire where the label or adhesive appliqué would undergo strain that is equal to or less than the threshold strain when the tire is loaded and operating under pre-defined conditions. The designer or manufacturer will determine the pre-defined conditions based on the particular constraints of each application. For example, the pre-defined conditions might include a particular tire model's average operating speed, loading conditions, driving conditions, and weather conditions.

At step 520, the designer or manufacturer will insert a green tire into the mold and cure the tire. At step 530, the designer or manufacture will affix a label onto a corresponding to the mounting location of the cured tire, using an adhesive or any other known means of affixing.

Optionally, at step 540, an adhesive appliqué is provided to an end-user of the cured tire, for attachment to the label.

Figure 6:
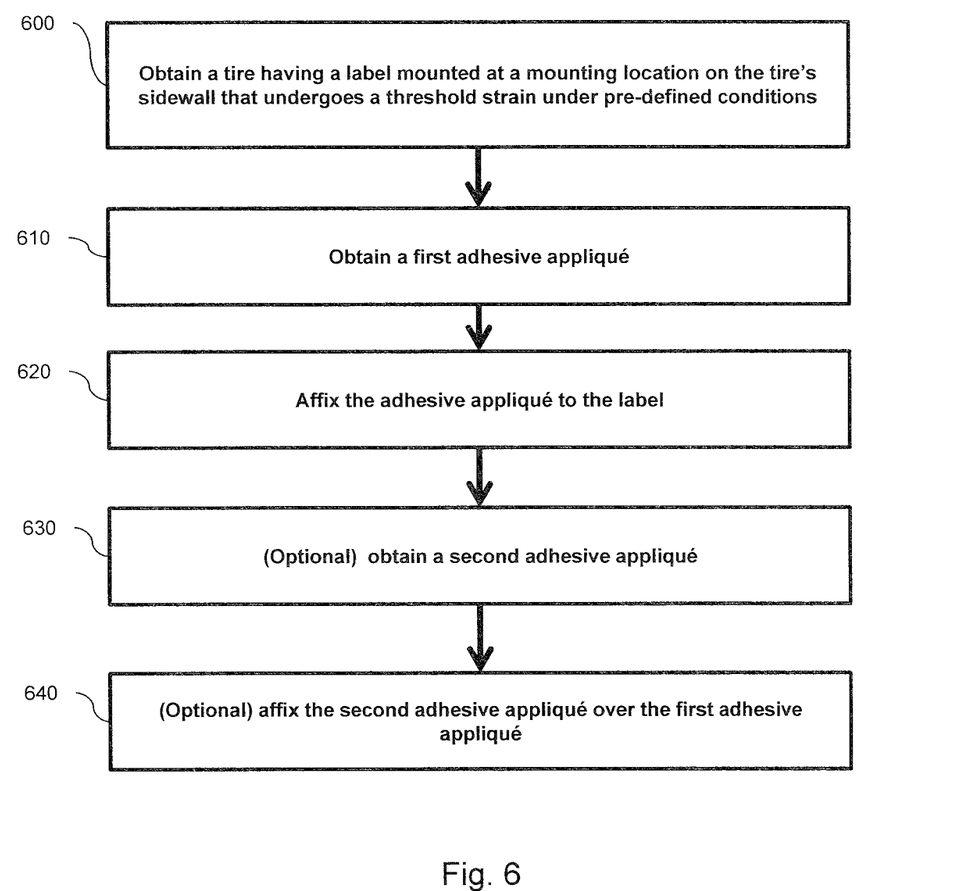
FIG. 6 is a flow chart of an exemplary method of affixing an adhesive appliqué to the tire of FIG. 1.

FIG. 6 depicts a method of affixing an adhesive appliqué to a tire having a label. At step 600, an end user obtains a tire made by one of the methods discussed above. The user may purchase the tire, for example. At step 610, the user obtains a first adhesive appliqué, for example by purchasing an adhesive appliqué from a seller. The seller may be a tire manufacturer, a retailer associated with a tire manufacturer, a vehicle manufacturer, a retailer associated with a vehicle manufacturer, a retailer not associated with either a tire or a vehicle manufacturer, a tire maintenance provider, a vehicle maintenance provider, or a third party, such as a service station. At step 620, the adhesive appliqué is affixed to the label of the tire. The step of affixing the label may be performed by an end-user of the tire, a tire manufacturer, a vehicle manufacturer, a retailer associated with either a tire manufacturer or a vehicle manufacturer, a retailer not associated with either a tire manufacturer or a vehicle manufacturer, a vehicle maintenance provider, a tire maintenance provider, another third party, or any actor. Optionally, at step 630 and step 640, the user may obtain a second adhesive appliqué, and the second adhesive appliqué may be affixed over the first adhesive appliqué. Step 630 or step 640 may be performed by an end-user of the tire, a tire manufacturer, a vehicle manufacturer, a retailer associated with either a tire manufacturer or a vehicle manufacturer, a retailer not associated with either a tire manufacturer or a vehicle manufacturer, a vehicle maintenance provider, a tire maintenance provider, another third party, or any actor.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method for providing a tire configured to receive a pre-printed adhesive applique, comprising:
   measuring a property of the pre-printed adhesive applique, wherein the property is selected from the group consisting of an ultimate tensile strength, a fatigue life, and a maximum elastic strain;
   identifying a threshold strain of the pre-printed adhesive applique, based on the measured property of the pre-printed adhesive applique;
   identifying a mounting location on a tire sidewall that undergoes a strain less than or equal to the threshold strain under pre-defined conditions;
   the threshold strain is identified within a range of 0 to 10%;
   providing a label;
   placing the label on the mounting location;
   curing the tire while the label is mounting location; and
   applying the pre-printed adhesive applique to the label after the curing of the tire.

2. The method of claim 1, further comprising providing a tire mold with a securing device at a tire mold location corresponding to the mounting location of the tire.

3. The method of claim 2, further comprising securing the label in the securing device before curing the tire.

4. The method of claim 2, wherein the securing device includes an indentation in the tire mold.

5. The method of claim 2, wherein the securing device includes a vacuum line that runs to an interior surface of the tire mold and holds the label in place during curing.

6. The method of claim 1, wherein the label contains a radio frequency identification tag or a radio frequency identification chip.

7. The method of claim 1, wherein the label is rubber-backed, and is at least partially vulcanized with the tire during curing.

8. The method of claim 1, wherein the label is substantially flush with the sidewall of the tire after curing.

9. The method of claim 1, wherein the pre-defined conditions include a condition in which the tire bears a pre-defined load and operates at pre-defined speeds.

10. The method of claim 1, wherein the pre-printed adhesive appliqué includes a first surface having an adhesive and a second surface having indicia displayed thereon, the second surface being opposite the first surface, and wherein the step of applying the pre-printed adhesive appliqué to the label includes applying the first surface of the pre-printed adhesive appliqué to the label.

11. The method of claim 1, wherein the measured property is the ultimate tensile strength of the pre-printed adhesive appliqué.

12. The method of claim 1, wherein the measured property is the fatigue life of the pre-printed adhesive appliqué.

13. The method of claim 1, wherein the measured property is the maximum elastic strain of the pre-printed adhesive appliqué.

14. The method of claim 1, wherein the measured property is the ultimate tensile strength and the fatigue life of the pre-printed adhesive appliqué.

15. The method of claim 1, wherein the measured property is the ultimate tensile strength and the maximum elastic strain of the pre-printed adhesive appliqué.

16. The method of claim 1, wherein the measured property is the fatigue life and the maximum elastic strain of the pre-printed adhesive appliqué.

17. The method of claim 1, wherein the measured property is the ultimate tensile strength, the fatigue life, and the maximum elastic strain of the pre-printed adhesive appliqué.

* * * * *